(12) United States Patent
Cheon et al.

(10) Patent No.: US 8,928,247 B2
(45) Date of Patent: Jan. 6, 2015

(54) POWER COMPENSATION DEVICE AND LIGHT EMITTING DIODE ILLUMINATION APPARATUS HAVING THE SAME

(71) Applicant: LG Electronics Inc., Seoul (KR)

(72) Inventors: Jeong In Cheon, Seoul (KR); Se Joon You, Seoul (KR); Jang Hwan Cho, Seoul (KR); Do Hyung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 13/724,690

(22) Filed: Dec. 21, 2012

(65) Prior Publication Data
US 2013/0257298 A1   Oct. 3, 2013

(30) Foreign Application Priority Data
Mar. 29, 2012   (KR) .......................... 10-2012-0032371

(51) Int. Cl.
*H05B 37/02* (2006.01)
*H05B 33/08* (2006.01)

(52) U.S. Cl.
CPC .............. *H05B 37/02* (2013.01); *H05B 33/083* (2013.01)
USPC ........... 315/291; 315/294; 315/307; 315/312; 315/185 R

(58) Field of Classification Search
CPC ............. H05B 33/083; H05B 33/0833; H05B 33/0815; H05B 33/0803; H05B 37/02; H05B 37/029; Y02B 20/347
USPC ............. 315/291, 294, 297, 307, 312, 185 R, 315/247; 345/82, 204
See application file for complete search history.

(56) References Cited

U.S. PATENT DOCUMENTS

| | | | | |
|---|---|---|---|---|
| 7,830,097 B2* | 11/2010 | Kunimatsu | .................... | 315/291 |
| 8,164,276 B2* | 4/2012 | Kuwabara | .................... | 315/294 |
| 8,400,082 B2* | 3/2013 | Lee | ................ | 315/312 |
| 8,487,546 B2* | 7/2013 | Melanson | .................... | 315/291 |
| 8,598,796 B2* | 12/2013 | Jeong | ........................... | 315/192 |

FOREIGN PATENT DOCUMENTS

KR   10-2011-0090201   8/2011

* cited by examiner

*Primary Examiner* — Haiss Philogene
(74) *Attorney, Agent, or Firm* — Ked & Associates, LLP

(57) ABSTRACT

A light emitting diode (LED) illumination device having a power compensation function is provided. The illumination device includes a light emitting unit including a plurality of LEDs connected in series, a rectifier for rectifying input AC power to provide a rectified voltage to the light emitting device, and a power compensator for detecting a change in the rectified voltage provided to the light emitting device and compensating a current provided to the light emitting device according to the detected change in the rectified voltage.

20 Claims, 11 Drawing Sheets

POWER COMPENSATION DEVICE AND LIGHT EMITTING DIODE ILLUMINATION APPARATUS HAVING THE SAME

CROSS-REFERENCE TO RELATED APPLICATION(S)

This application claims the benefit of Korean Patent Application No. 2012-0032371, filed in Korea on May 29, 2012, whose entire disclosure is hereby incorporated by reference.

BACKGROUND

1. Field

The present disclosure relates to an illumination device, and more particularly, to a light emitting diode (LED) illumination device having a power compensation function.

2. Background

Illumination devices having power compensation are known. However, they suffer from various disadvantages.

BRIEF DESCRIPTION OF THE DRAWINGS

The embodiments will be described in detail with reference to the following drawings in which like reference numerals refer to like elements, wherein.

DETAILED DESCRIPTION

Figure 1:
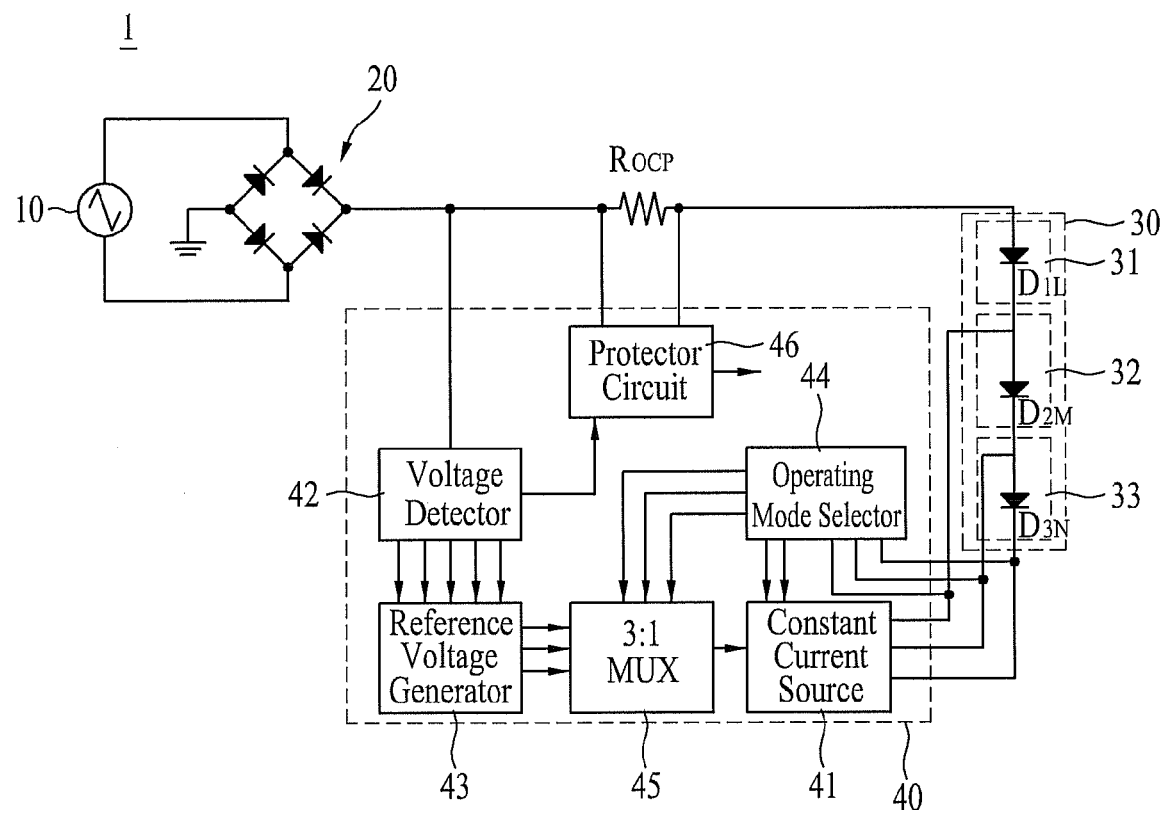
FIG. 1 is a circuit diagram illustrating an exemplary LED illumination device.

Embodiments of the present disclosure will now be described in detail with reference to the accompanying drawings. While the present disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

It will be understood that when an element such as a layer, region or substrate is referred to as being "on" another element, it can be directly on the other element or intervening elements may also be present. Moreover, it will be understood that, although the terms first, second, etc., may be used herein to describe various elements, components, regions, layers and/or sections, these elements, components, regions, layers and/or sections should not be limited by these terms.

Generally, illumination devices may have various types of light sources such as, for example, light emitting diodes (LED), incandescent, fluorescent, or the like. Among these types, LEDs have advantages such as high efficiency, color variety, and design flexibility. LEDs are semiconductor elements which emit light when voltage is applied thereto in a forward direction. LEDs have a relatively longer life span and lower power consumption. LEDs also have electrical, optical, and physical characteristics suitable for mass production.

To efficiently use such LEDs as a light source of an illumination device, there is a need to provide a driving system which can drive the illumination device with commercial AC power. However, the output voltage of commercial AC power may vary widely to affect the performance of the LED based illumination device. For example, LEDs may be sensitive to the fluctuation of the voltage level inherent in the sinusoidal wave of commercial AC power. Moreover, the LEDs may be sensitive to changes in the magnitude of the AC voltage, e.g., the peak voltage, to vary the brightness of the LEDs. For example, the peak voltage of commercial AC power may vary between different regions, and may cause variations in brightness of the LEDs. These voltage variations may cause flickering or inconsistent brightness of the LEDs from region to region.

Accordingly, as broadly described and embodied herein the LED type illumination device may be configured to have a power compensation function that substantially obviates one or more problems due to limitations and disadvantages of the related art. That is, the LED illumination device may compensate for changes in input power caused by variations in the voltage of a power source.

As shown in FIG. 1, the LED illumination device 1 may include a light emitting device 30 including a plurality of groups of LEDs $D_{1L}$, $D_{2M}$, and $D_{3N}$, which may be connected in series. The LED illumination device 1 may further include a rectifier 20 that rectifies AC power 10 and provides a rectified voltage waveform (also referred to as a ripple voltage) to the light emitting device 30. The LED illumination device 1 may also include a power compensator 40 that detects a change in the voltage provided to the light emitting device 30 and compensates for the detected change.

The rectifier 20 may use a bridge diode which may provide full-wave rectification of the AC power 10 to generate a rectified voltage (also referred to herein as a ripple voltage) of the AC waveform. The power compensator 40 may detect changes in levels of the rectified voltage (e.g., of the rectified waveform at various points in time) provided to the light emitting device 30 and may compensate the amount of current provided to the light emitting device 30 based on the detected change in the rectified voltage. Simply for ease of discussion, embodiments are described with reference to a full wave rectifier that produces a full wave rectification of a sinusoidal waveform. However, it should be appreciated that other types of rectifiers as well as other various types of waveforms are within the scope of the present disclosure.

The light emitting device 30 may include at least two groups of LEDs ($D_m$, $D_{2M}$, or $D_{3N}$) which are illuminated at different times according to the magnitude of the rectified voltage. As illustrated in FIG. 1, the light emitting device 30 may include three groups which may include a plurality of LEDs $D_{1L}$, $D_{2M}$, and $D_{3N}$, respectively. That is, the first group 31 may include L number of LEDs, the second group 32 may include M number of LEDs, and the third group 33 may include N number of LEDs. The numbers of LEDs L, M, and N of the groups may be equal to each other or may be different from each other.

The amount of light emitted by the light emitting device 30 having the three groups 31, 32, and 33 may vary with time. For example, one of the three groups 31, 32, and 33 may be controlled to emit light or all three groups 31, 32, and 33 may be controlled to emit light according to the level of the rectified voltage at various points in time.

The power compensator 40 may include a constant current source 41 (also referred to as a current control circuit) and may determine the amount of current that flows through the light emitting device 30. The constant current source 41 may function to control an amount of current that flows through the light emitting device 30 at prescribed levels, e.g., at a uniform level to produce a constant level of illumination.

Here, the power compensator 40 may perform current compensation by changing a reference voltage $V_{REF}$ supplied to the constant current source 41 according to changes in the rectified voltage. For example, the power compensator 40 may perform power compensation by increasing the reference voltage $V_{REF}$ of the constant current source 41 when the voltage of the rectified waveform is lower than a reference power source voltage and decreasing the reference voltage of the constant current source 41 when the voltage of the rectified waveform is higher than the reference power source voltage.

The voltage detector 42 may detect a level of the rectified voltage in order to perform power compensation. The power compensator 40 may include a reference voltage generator 43 that changes the reference voltage $V_{REF}$ according to the detected change in the voltage. The voltage detector 42 may also include a peak detector that detects a peak voltage of the rectified voltage.

Here, selective operation of the light emitting device 30 including a plurality of groups 31, 32, and 33 may be performed at an operating mode selector 44. When the light emitting device 30 includes a plurality of groups 31, 32, and 33, reference voltage signals $V_{REF1}$, $V_{REF2}$, $V_{REF3}$ generated by the reference voltage generator 43 may be input to the multiplexer 45 and then a select one may be input to a constant current source 41 according to each selected mode according to a group selected by the operating mode selector 44. That is, in order to drive a group of the light emitting device 30 selected by the operating mode selector 44, the multiplexer 45 may selectively connect a corresponding reference voltage $V_{REF1}$, $V_{REF2}$, $V_{REF3}$ generated by the reference voltage generator 43 to the constant current source 41.

A protection circuit 46 (also referred to as a protector) which protects the light emitting device 30 against overvoltage and overcurrent may be provided between the constant current source 41 and the light emitting device 30. The protection circuit 46 may cut-off power supplied to the light emitting device 30 and the power compensator 40 when overvoltage or overcurrent is detected by the detector 42.

Figure 2:
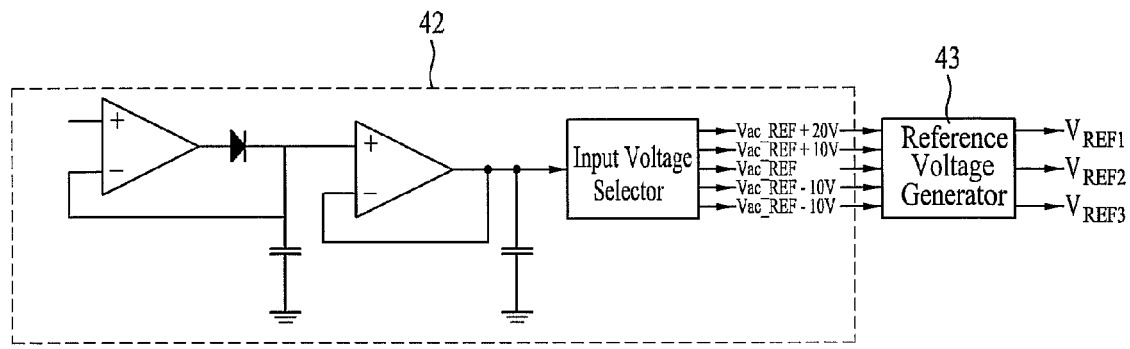
FIG. 2 is a circuit diagram illustrating an example of a detector and a reference voltage generator.

FIG. 2 illustrates an example of the voltage detector 42 and the reference voltage generator 43. The detector 42 may output a corresponding voltage level $V_{ac\_REF}$ when the magnitude of the rectified voltage detected by the detector 42 is equal to the reference power source voltage and outputs a corresponding voltage level when the magnitude of the rectified voltage is different from the reference power source voltage.

For example, the detector 42 may output voltage levels (e.g., $V_{ac\_REF}$+10V, $V_{ac\_REF}$+20V, $V_{ac\_REF}$−10V, or $V_{ac\_REF}$−20V) that are divided into a plurality of levels according to a change in the magnitude of the rectified voltage from the reference power source voltage. That is, the detector 42 may output different voltage levels as the level of the rectified voltage at a prescribed point in time increases or decreases relative to the reference power source voltage according to the full-wave rectified signal. Although the difference between each of the levels is disclosed as being 10V in the example of FIG. 2, the increments between each of the levels may be changed according to need, and the number of levels available may be increased or decreased as desired.

Figure 3:
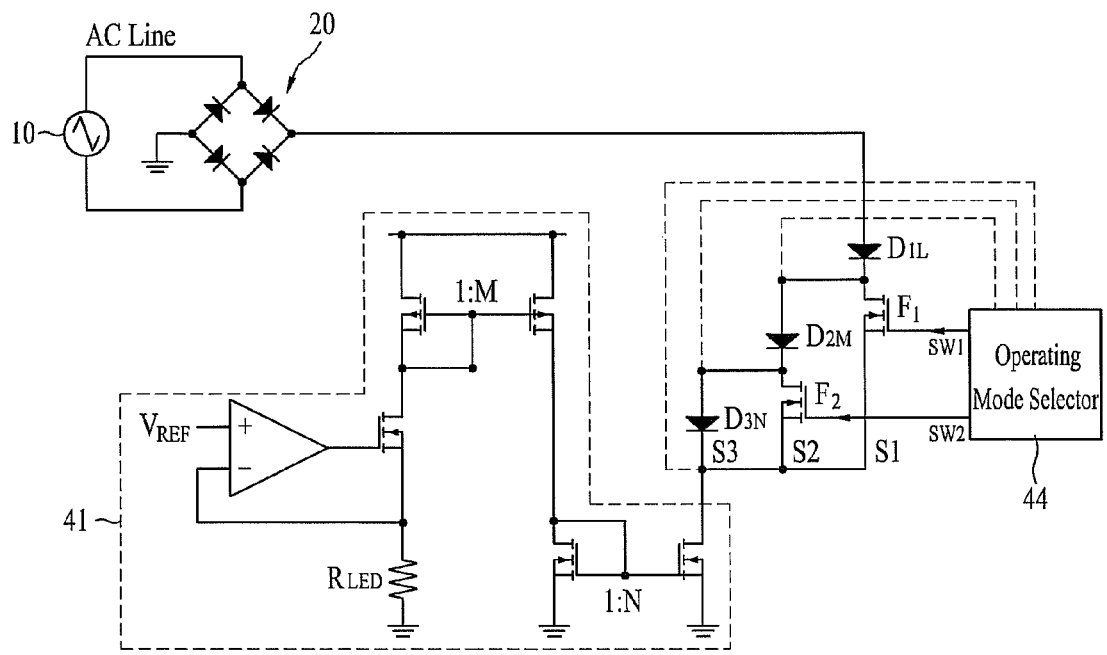
FIG. 3 is a circuit diagram illustrating an example of a constant current source and an operating mode selector.

The reference voltage generator 43 may output reference voltages $V_{REF1}$, $V_{REF2}$, and $V_{REF3}$ provided to the constant current source 41 according to the voltage level output $V_{ac\_REF}$ from the detector 42. As illustrated in FIG. 3, the output reference voltages $V_{REF1}$, $V_{REF2}$, and $V_{REF3}$ may be provided to the constant current source 41 such that current levels according to the operating modes S1, S2, and S3 of the light emitting device 30 are determined and the determined current levels flow to the light emitting device 30.

The operating mode selector 44 may control a first switch $F_1$ and a second switch $F_2$ so as to selectively drive the light emitting device 30 including the three groups of LEDs $D_{1L}$, $D_{2L}$, and $D_{3L}$ in this example. The switches $F_1$ and $F_2$ may use a metal-oxide-semiconductor field effect transistor (MOSFET) and may also use a bipolar transistor.

Accordingly, a reference voltage $V_{REF1}$, $V_{REF2}$, $V_{REF3}$ generated by the reference voltage generator 43 may be selected by the multiplexer 45 according to each of the operating modes S1, S2, and S3 of the light emitting device 30 and the selected reference voltage $V_{REF}$ may be input to the constant current source 41 corresponding to the mode.

Figure 4:
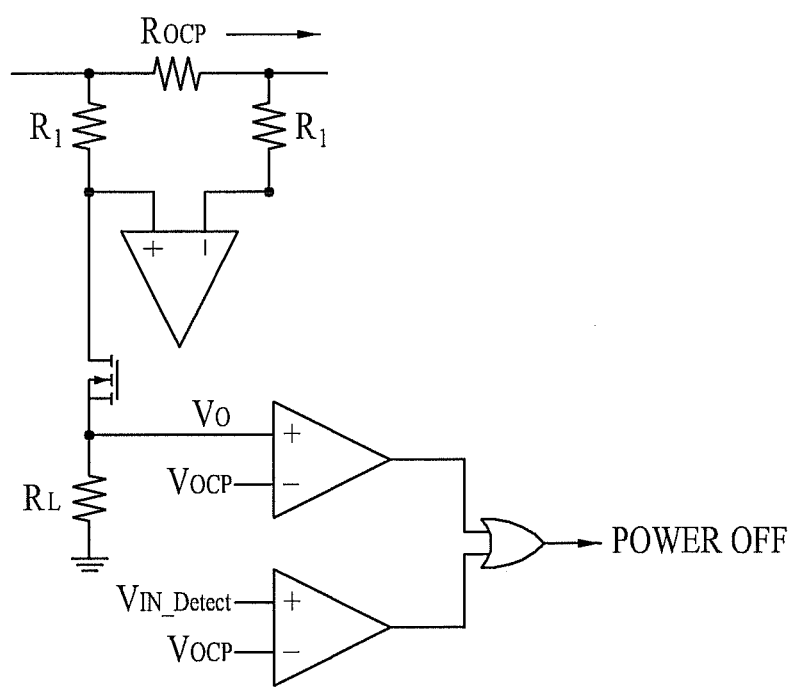
FIG. 4 is a circuit diagram illustrating an exemplary protector circuit.

FIG. 4 illustrates an example of the protection circuit 46. The protection circuit 46 may be connected between the rectifier 20 and the light emitting device 30 across a resistor $R_{OCP}$ as illustrated. The protection circuit 46 may cut-off power supplied to the light emitting device 30 and the power compensator 40 according to a signal received from the detector 42.

Hereinafter, operation of the circuit of FIG. 1 is described in detail in chronological order.

Figure 5A:
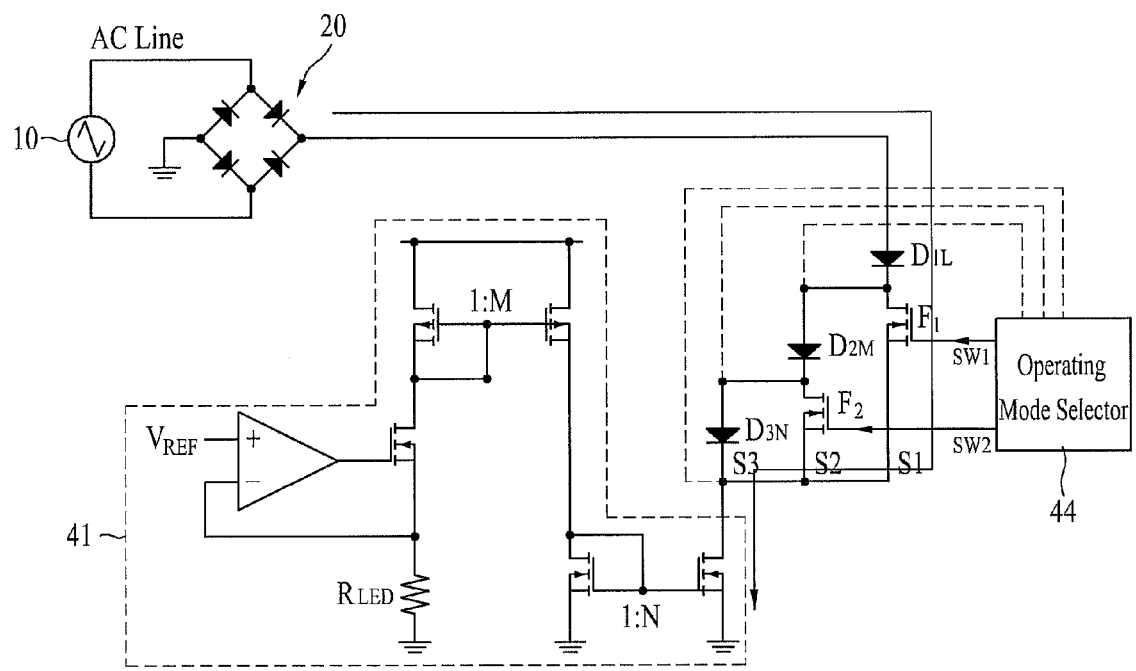
FIGS. 5A and 5B illustrate operations and waveforms of the circuit of FIG. 1 when the circuit operates in a first mode.
Figure 5B:
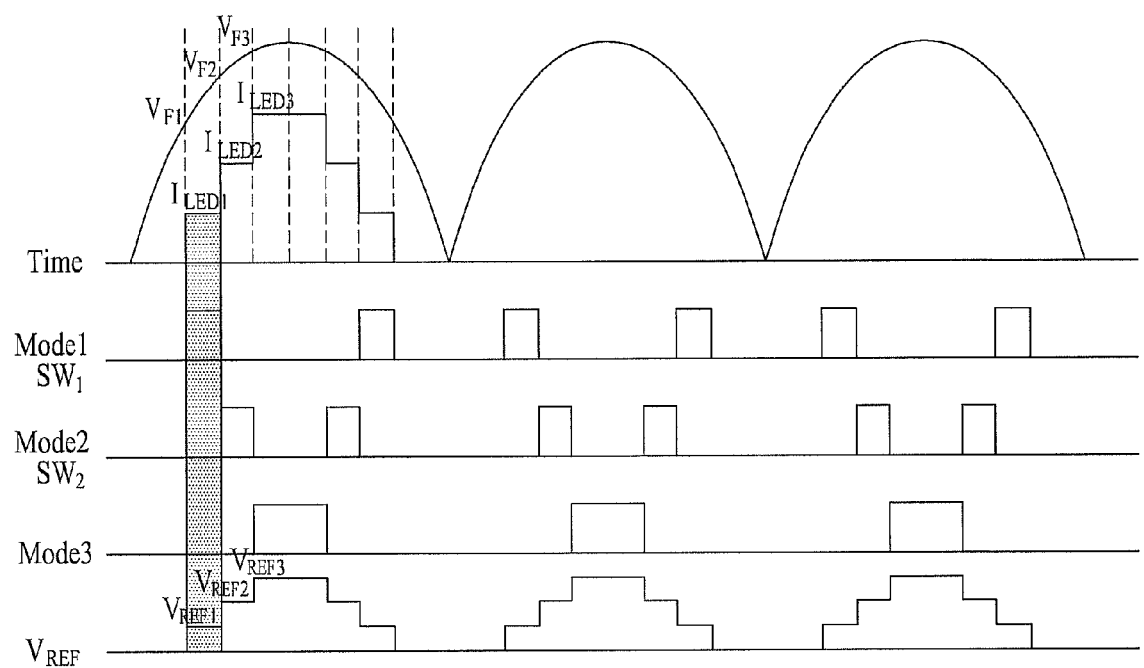

First, operation of the circuit of FIG. 1 when the magnitude of the rectified voltage is low is described below with reference to FIGS. 5A and 5B. When the magnitude of the rectified voltage is at a low level ($V_{F1}$), the circuit of FIG. 1 enters a first mode S1 in which the operating mode selector 44 controls the switches $F_1$ and $F_2$ such that the first switch $F_1$ is closed and the second switch $F_2$ is opened to turn on only the LEDs $D_{1L}$ belonging to the first group 31.

Accordingly, the reference voltage generator 43 provides a reference voltage $V_{REF1}$ corresponding to the operating mode S1 to the constant current source 41. In this case, the constant current source 41 controls a current $I_{LED1}$ to flow through the LEDs $D_{1L}$ of the first group 31 according to the following Expression 1:

$$I_{LED1} = \frac{V_{REF1}}{R_{LED}} \times NM \quad (1)$$

where, $R_{LED}$ is a resistor connected to the constant current source 41 and N and M are constants that are determined according to the design of the circuit.

Figure 6A:
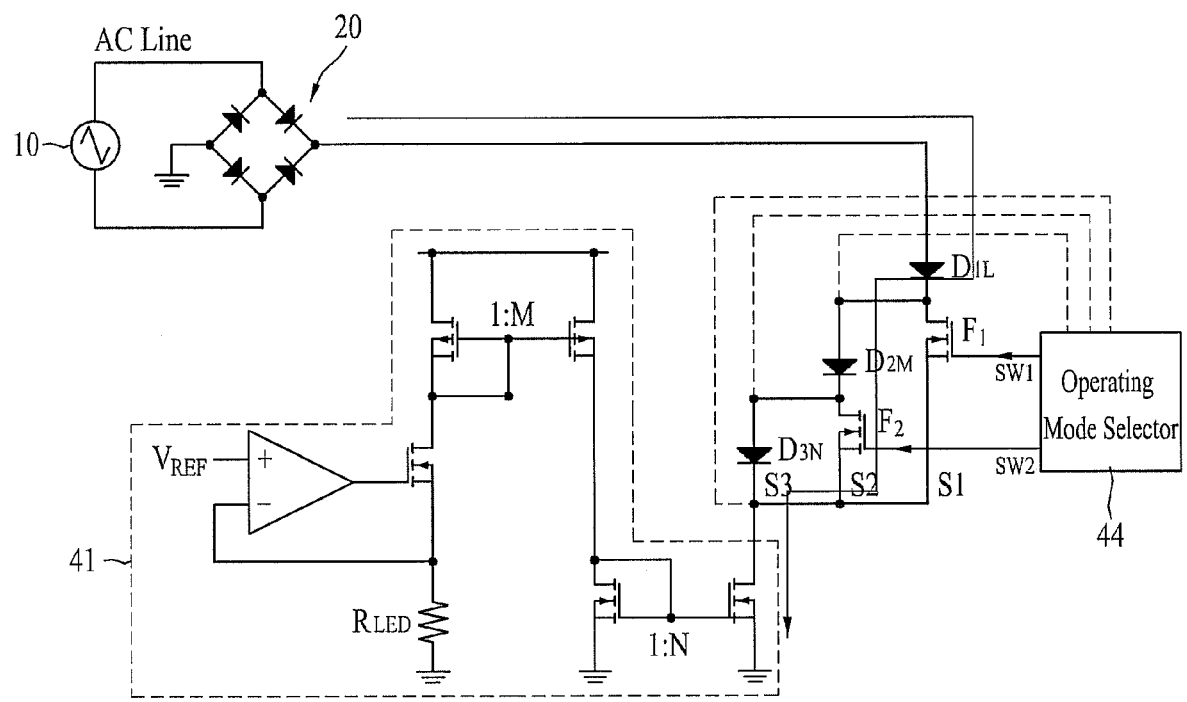
FIGS. 6A and 6B illustrate operations and waveforms of the circuit of FIG. 1 when the circuit operates in a second mode.
Figure 6B:
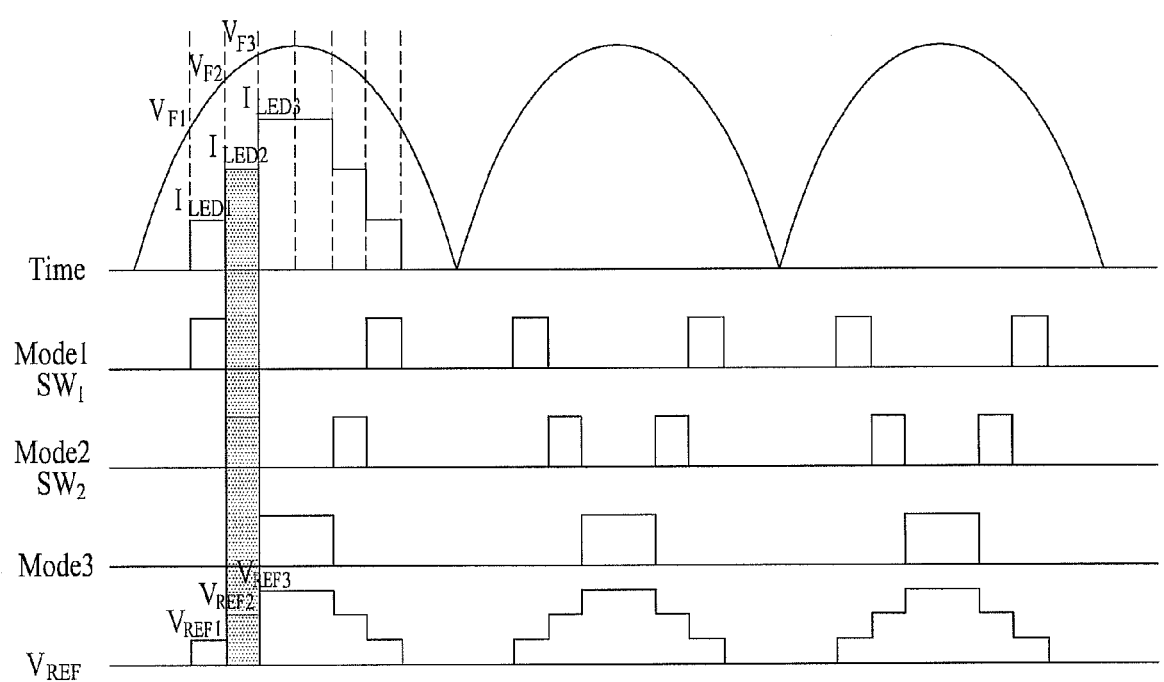

Then, as illustrated in FIGS. 6A and 6B, when the magnitude of the rectified voltage is increased to a second level ($V_{F2}$), the circuit of FIG. 1 operates in a second mode S2 in which the operating mode selector 44 controls the switches $F_1$ and $F_2$ such that the first switch $F_1$ is opened and the second switch $F_2$ is closed to turn-on the LEDs $D_{1L}$ and $D_{2M}$ belonging to both the first group 31 and the second group 32, respectively.

Here, the reference voltage generator 43 provides a reference voltage $V_{REF2}$ corresponding to the operating mode S2 to the constant current source 41. As switch $F_2$ is closed, LEDs $D_{3N}$ of the third group 33 may be turned-off. Accordingly, in the second mode S2, the constant current source 41 may control a current $I_{LED2}$ to flow through the LEDs $D_{1L}$ of the first group 31 and the LEDs $D_{2M}$ of the second group 32 according to the following Expression 2:

$$I_{LED2} = \frac{V_{REF2}}{R_{LED}} \times NM \quad (2)$$

where, $R_{LED}$ is a resistor connected to the constant current source 41 and N and M are constants that are determined according to design of the circuit.

Figure 7A:
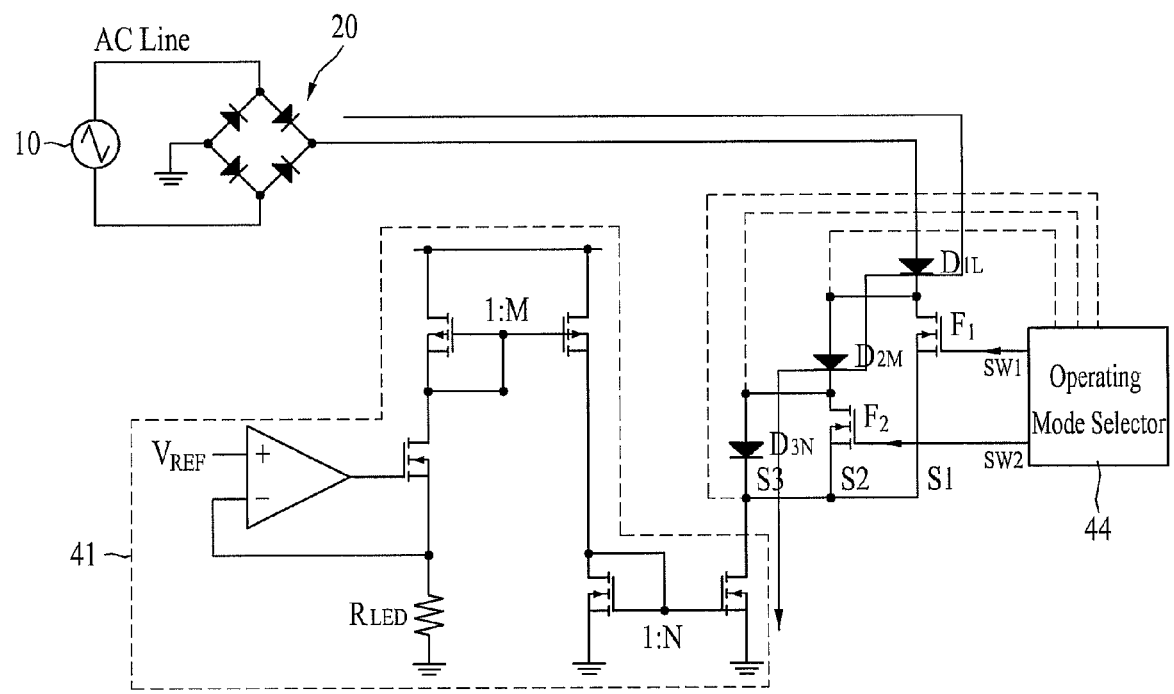
FIGS. 7A and 7B illustrate operations and waveforms of the circuit of FIG. 1 when the circuit operates in a third mode.
Figure 7B:
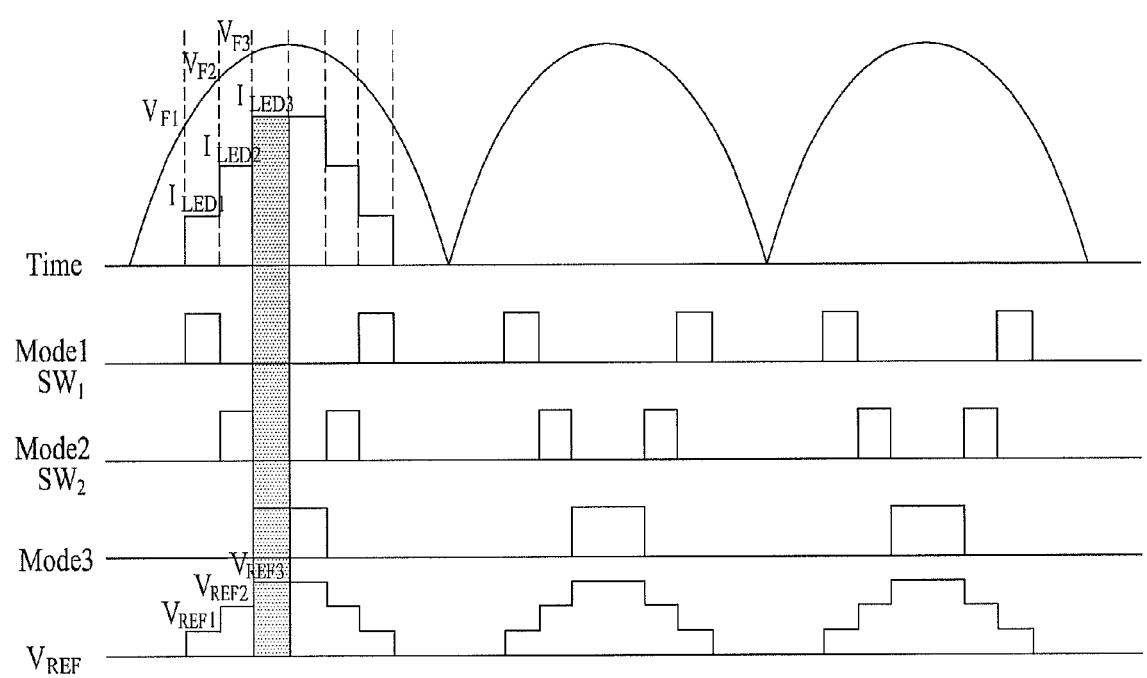

Then, as illustrated in FIGS. 7A and 7B, when the magnitude of the rectified voltage is further increased to a third level ($V_{F3}$), the circuit of FIG. 1 enters a third mode S3 in which the operating mode selector 44 controls the switches $F_1$ and $F_2$ such that both the first switch $F_1$ and the second switch $F_2$ are opened to turn-on the LEDs $D_{1L}$, $D_{2M}$, and $D_{3N}$ belonging to all of the first group 31, the second group 32, and the third group 33, respectively.

Here, the reference voltage generator 43 provides a reference voltage $V_{REF3}$ corresponding to the operating mode S3 to the constant current source 41. Accordingly, in the second mode S2, the constant current source 41 may control a current $I_{LED3}$ to flow through the LEDs $D_{1L}$, $D_{2M}$, and $D_{3N}$ belonging to the first group 31, the second group 32, and the third group 33 according to the following Expression 3:

$$I_{LED3} = \frac{V_{REF3}}{R_{LED}} \times NM \quad (3)$$

where, $R_{LED}$ is a resistor connected to the constant current source 41 and N and M are constants that are determined according to design of the circuit.

In this manner, the groups 31, 32, and 33 of the light emitting device 30 may be selectively driven according to the magnitude of the rectified voltage and the power compensator 40 may determine an appropriate amount of current to flow through the light emitting device 30 corresponding to each mode. Moreover, the described voltage levels $V_{F1}$, $V_{F2}$, $V_{F3}$ may be determined based relative to the actual rectified input voltage or based on a preset value in order to determine the corresponding mode of operation.

Figure 8:
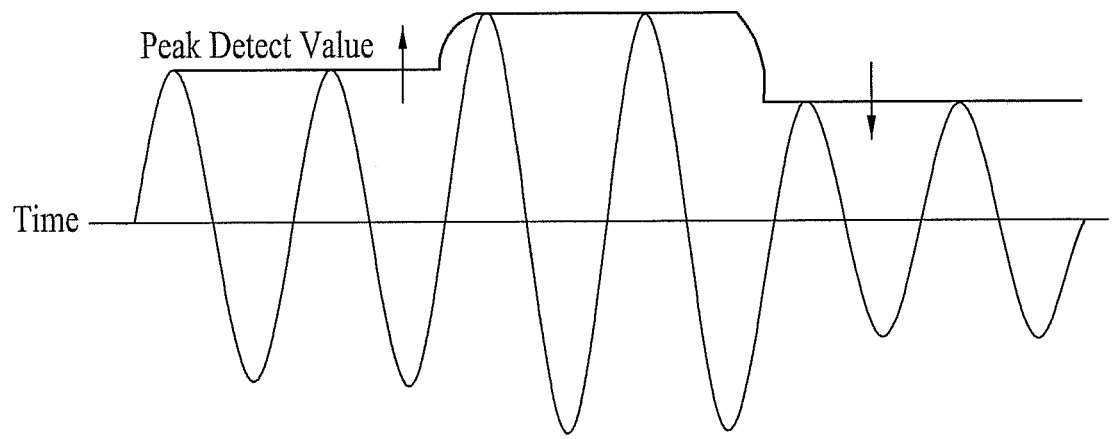
FIG. 8 is a schematic diagram illustrating variations in a peak input power source voltage.

FIG. 8 is a diagram illustrating variations in the peak input power source voltage. The voltage of a power source may fluctuate over a given period of time or vary from region to region. A peak input power source voltage $V_{IN\_PEAK}$ of the full-wave rectified signal input to the lighting apparatus may include these variations in voltage, which may affect the operation of the LEDs. For example, variations in the peak input power source voltage $V_{IN\_PEAK}$ may cause the brightness of the LEDs to vary or may cause flickering. The following is a description of an operation of the power compensator 40 according to changes in the peak input voltage $V_{IN\_PEAK}$.

Figure 9:
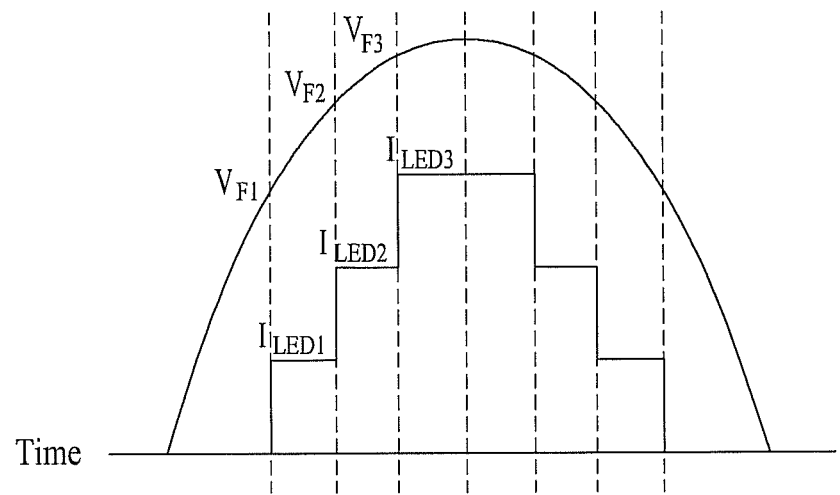
FIG. 9 is a waveform diagram illustrating voltage and current waveforms when the input power source voltage is equal to a reference power source voltage.

First, the voltage detector 42 may detect the input power source voltage. When the magnitude of the initial peak voltage is equal to (or within a prescribed range of) a reference peak input voltage, the detector 42 may output a reference voltage level. Accordingly, the reference voltage generator 43 may provide a reference voltage $V_{REF}$ corresponding to the reference voltage level to the constant current source 41 in order to drive the light emitting device 30. The voltage and current in this case may exhibit waveforms as illustrated in FIG. 9.

However, when the detector 42 has detected that the input power source voltage is either higher or lower than the reference power source voltage, the reference voltage may be adjusted based on the detected voltage and the constant current source 41 may determine a current level to drive the light emitting device 30 according to the changed reference voltage.

Figure 10:
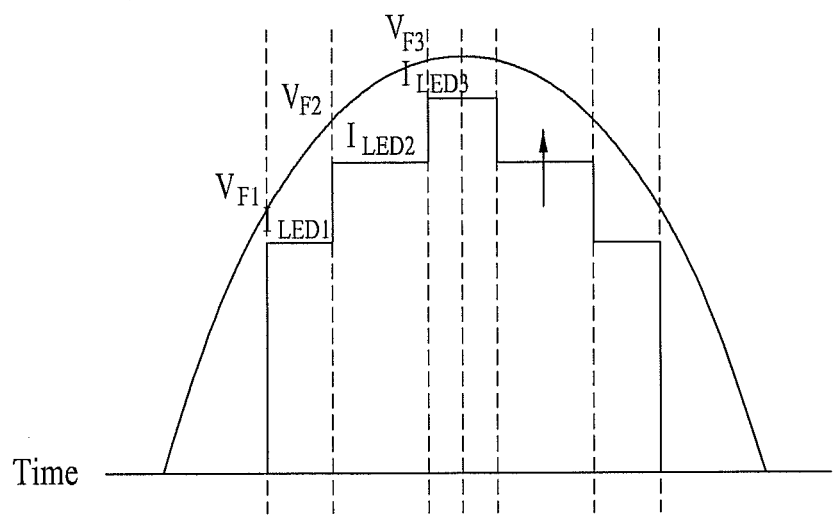
FIG. 10 is a waveform diagram illustrating voltage and current waveforms when the input power source voltage is lower than the reference power source voltage.

That is, when the detector 42 has detected that the input power source voltage is lower than the reference power source voltage, the detector 42 may output a corresponding voltage level to the reference voltage generator 43 and the reference voltage generator 43 may compensate the reference voltage according to the voltage level by increasing the reference voltage such that the current flowing through the light emitting device 30 is increased accordingly as illustrated in FIG. 10.

That is, the reference voltage generator 43 may provide the compensated (increased) reference voltage to the constant current source 41 and the operating mode selector 44 and the multiplexer 45 may operate to allow the light emitting device 30 to be driven by a current level determined by the constant current source 41 according to the operating mode of the light emitting device 30.

On the other hand, when the detector 42 has detected that the input power source voltage is higher than the reference power source voltage, the detector 42 may output a corresponding voltage level to the reference voltage generator 43 and the reference voltage generator 43 may compensate the reference voltage according to the voltage level.

Figure 11:
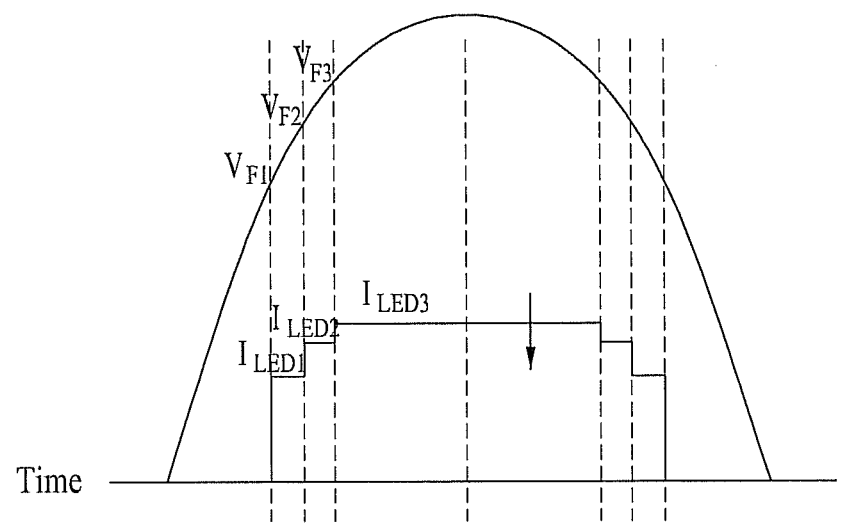
FIG. 11 is a waveform diagram illustrating voltage and current waveforms when the input power source voltage is higher than the reference power source voltage.

That is, the reference voltage generator 43 may compensate the reference voltage according to the voltage level by decreasing the reference voltage such that the current flowing through the light emitting device 30 is decreased accordingly as illustrated in FIG. 11.

Namely, the reference voltage generator 43 may provide the compensated (decreased) reference voltage to the constant current source 41 and the operating mode selector 44 and the multiplexer 45 may operate to allow the light emitting device 30 to be driven by a current level determined by the constant current source 41 according to the operating mode of the light emitting device 30.

As broadly described and embodied herein, the illumination device including the light emitting device 30, which is driven by AC power, can perform power compensation for changes in the AC power, and therefore it is possible to minimize changes in power output due to changes in the input power source voltage and minimize changes in the brightness of the light emitting device 30 due to the same.

In addition, such power compensation may allow the light emitting device 30 to be driven to emit light with uniform brightness regardless of voltage deviations between regions. Further, when changes in AC power exceeds a predetermined range, the protector 46 may cut off power so as to protect the illumination device and the light emitting device 30.

In one embodiment, a light emitting diode (LED) lighting apparatus may include a light emitting device including a plurality of LEDs connected in series, a rectifier for converting an AC voltage signal to a rectified voltage signal to power the light emitting device, a voltage detector for detecting a level of the rectified voltage signal, a reference voltage generator for generating a reference voltage based on the detected voltage, and a current control circuit configured to control an amount of current that flows through the light emitting device based on the generated reference voltage, wherein the generated reference voltage is adjusted to compensate for changes in the rectified voltage signal.

The detected level of the rectified voltage signal may correspond to a waveform of the rectified voltage signal. A controller may be provided and configured to control an operation of the plurality of LEDs, wherein the controller turns on one or more of the LEDs based on the level of the rectified voltage signal. A number of LEDs controlled to operate is increased to correspond to an increase in the rectified voltage signal and decreased to correspond to a decrease in the rectified voltage signal.

When the detected level of the rectified voltage is within a first prescribed range, the controller may operate a first prescribed group of LEDs, and when the detected level of the rectified voltage is within a second prescribed range, the controller may operate a second prescribed group of LEDs. The second prescribed level may be greater than the first prescribed level, and a number of LEDs in the second prescribed group of LEDs is greater than the first prescribed group of LEDs.

A first prescribed group of LEDs may be powered on after a first prescribed amount of time and a second prescribed group of LEDs may be powered on after a second prescribed amount of time. The reference voltage level may correspond to a number of LEDs that are turned on.

A multiplexer may be provided for adjusting the reference voltage signal, wherein the multiplexer selects one of a prescribed number of reference voltage signals that correspond to a number of LEDs to be turned on, and transmits the selected reference voltage signal to the current control circuit.

The LED lighting apparatus may include an operating mode selector for selecting an operating mode to selectively power on at least one of a plurality of groups of LEDs, and a multiplexer for selecting a reference voltage for the current control circuit based on the selected operating mode. The operating mode selector may include at least one switch and may be configured to control the switch to selectively provide power to the selected group of LEDs.

A protection circuit may be provided between the rectifier and the light emitting device to protect the light emitting device against overvoltage and overcurrent. The protection circuit may be connected between the rectifier and the light emitting device across a resistor and is configured to cut-off power to the light emitting device based on a signal received from the voltage detector.

The voltage detector may include a peak voltage detector and the detected level is a peak voltage of the rectified voltage signal. The reference voltage generator may adjust the reference voltage based on the detected level of the rectified voltage signal. Moreover, the reference voltage generator may increase the reference voltage signal when the detected peak voltage is less than a prescribed peak voltage level, and decrease the reference voltage signal when the detected peak voltage is greater than the prescribed peak voltage level.

In one embodiment, a light emitting diode (LED) lighting apparatus may include a light emitting unit including a plurality of LEDs connected in series, a rectifier that converts an AC voltage signal to a rectified voltage signal for the light emitting device, and a power compensator circuit configured to detect a change in the rectified voltage signal level, adjust a reference voltage for controlling an amount of current that flows through the light emitting device based on the change in the rectified voltage signal level, and control the amount of current that flows through the light emitting device based on the adjusted reference voltage, wherein a number of LEDs controlled to operate is increased to correspond to an increase in the rectified voltage signal and decreased to correspond to a decrease in the rectified voltage signal. In this embodiment, the reference voltage may be adjusted based on a detected peak voltage of the rectified voltage signal, the reference voltage signal being increased when the detected peak voltage is less than a prescribed peak voltage level and decreased when the detected peak voltage is greater than the prescribed peak voltage level.

In one embodiment, a light emitting diode (LED) illumination device may include a light emitting unit including a plurality of LEDs connected in series, a rectifier for rectifying AC power and providing a ripple voltage to the light emitting unit, and a power compensator for detecting a change in the ripple voltage provided to the light emitting unit and compensating a current provided to the light emitting unit according to the detected change in the ripple voltage.

In one embodiment, an LED illumination device may include a light emitting unit including a plurality of LEDs connected in series, a rectifier for rectifying AC power and providing a ripple voltage to the light emitting unit, and a power compensator including a detector for detecting a change in the AC power, a reference voltage generator for changing a reference voltage so as to compensate a current flowing through the light emitting unit according to the change in the AC power, and a constant current source for determining a current flowing through the light emitting unit according to the reference voltage.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting diode (LED) lighting apparatus comprising:
 a light emitting device including a plurality of LEDs connected in series;
 a rectifier for converting an AC voltage signal to a rectified voltage signal to power the light emitting device;

a voltage detector for detecting a level of the rectified voltage signal;

a reference voltage generator for generating a reference voltage based on the detected voltage; and a current control circuit configured to control an amount of current that flows through the light emitting device based on the generated reference voltage, wherein the generated reference voltage is adjusted to compensate for changes in the rectified voltage signal.

2. The LED lighting apparatus of claim 1, wherein the detected level of the rectified voltage signal corresponds to a waveform of the rectified voltage signal.

3. The LED lighting apparatus of claim 1, further comprising a controller configured to control an operation of the plurality of LEDs, wherein the controller turns on one or more of the LEDs based on the level of the rectified voltage signal.

4. The LED lighting apparatus of claim 1, wherein a number of LEDs controlled to operate is increased to correspond to an increase in the rectified voltage signal and decreased to correspond to a decrease in the rectified voltage signal.

5. The LED lighting apparatus of claim 1, wherein, when the detected level of the rectified voltage is within a first prescribed range, the controller operates a first prescribed group of LEDs, and when the detected level of the rectified voltage is within a second prescribed range, the controller operates a second prescribed group of LEDs.

6. The LED lighting apparatus of claim 5, wherein the second prescribed level is greater than the first prescribed level, and a number of LEDs in the second prescribed group of LEDs is greater than the first prescribed group of LEDs.

7. The LED lighting apparatus of claim 1, wherein a first prescribed group of LEDs are powered on after a first prescribed amount of time and a second prescribed group of LEDs are powered on after a second prescribed amount of time.

8. The LED lighting apparatus of claim 1, wherein the reference voltage level corresponds to a number of LEDs that are turned on.

9. The LED lighting apparatus of claim 1, further comprising a multiplexer for adjusting the reference voltage signal, wherein the multiplexer selects one of a prescribed number of reference voltage signals that correspond to a number of LEDs to be turned on, and transmits the selected reference voltage signal to the current control circuit.

10. The LED lighting apparatus of claim 1, further including an operating mode selector for selecting an operating mode to selectively power on at least one of a plurality of groups of LEDs, and a multiplexer for selecting a reference voltage for the current control circuit based on the selected operating mode.

11. The LED lighting apparatus of claim 10, wherein the operating mode selector includes at least one switch and is configured to control the switch to selectively provide power to the selected group of LEDs.

12. The LED lighting apparatus of claim 1, further comprising a protection circuit provided between the rectifier and the light emitting device to protect the light emitting device against overvoltage and overcurrent.

13. The LED lighting apparatus of claim 12, wherein the protection circuit is connected between the rectifier and the light emitting device across a resistor and is configured to cut-off power to the light emitting device based on a signal received from the voltage detector.

14. The LED lighting apparatus of claim 1, wherein the voltage detector includes a peak voltage detector and the detected level is a peak voltage of the rectified voltage signal.

15. The LED lighting apparatus of claim 14, wherein the reference voltage generator adjusts the reference voltage based on the detected level of the rectified voltage signal.

16. The LED lighting apparatus of claim 15, wherein the reference voltage generator increases the reference voltage signal when the detected peak voltage is less than a prescribed peak voltage level, and decreases the reference voltage signal when the detected peak voltage is greater than the prescribed peak voltage level.

17. A light emitting diode (LED) lighting apparatus comprising:

a light emitting unit including a plurality of LEDs connected in series;

a rectifier that converts an AC voltage signal to a rectified voltage signal for the light emitting device; and a power compensator circuit configured to detect a change in the rectified voltage signal level, adjust a reference voltage for controlling an amount of current that flows through the light emitting device based on the change in the rectified voltage signal level, and control the amount of current that flows through the light emitting device based on the adjusted reference voltage, wherein a number of LEDs controlled to operate is increased to correspond to an increase in the rectified voltage signal and decreased to correspond to a decrease in the rectified voltage signal.

18. The LED lighting apparatus of claim 17, wherein the reference voltage is adjusted based on a detected peak voltage of the rectified voltage signal, the reference voltage signal being increased when the detected peak voltage is less than a prescribed peak voltage level and decreased when the detected peak voltage is greater than the prescribed peak voltage level.

19. A light emitting diode (LED) lighting apparatus comprising:

a light emitting unit including a plurality of LEDs connected in series;

a rectifier that converts an AC voltage signal to a rectified voltage signal for the light emitting device; and a power compensator circuit configured to detect a change in the rectified voltage signal level, adjust a reference voltage for controlling an amount of current that flows through the light emitting device based on the change in the rectified voltage signal level, and control the amount of current that flows through the light emitting device based on the adjusted reference voltage, wherein the reference voltage is adjusted based on a detected peak voltage of the rectified voltage signal, the reference voltage signal being increased when the detected peak voltage is less than a prescribed peak voltage level and decreased when the detected peak voltage is greater than the prescribed peak voltage level.

20. The LED lighting apparatus of claim 19, wherein a number of LEDs controlled to operate is increased to correspond to an increase in the rectified voltage signal and decreased to correspond to a decrease in the rectified voltage signal.

* * * * *